United States Patent
Schwarz et al.

(10) Patent No.: US 6,853,523 B1
(45) Date of Patent: Feb. 8, 2005

(54) SYSTEM AND A METHOD FOR PROTECTING AN ELECTRIC MOTOR AND ITS CONTROL CIRCUIT, AND AN ELECTRIC MOTOR

(75) Inventors: Marcos Guilherme Schwarz, Joinville (BR); Paulo Sergio Dainez, Joinville (BR)

(73) Assignee: Empresa Brasileira de Compressores S.A. -Embraco (BR)

( * ) Notice: Subject to any disclaimer, the term of this patent is extended or adjusted under 35 U.S.C. 154(b) by 0 days.

(21) Appl. No.: 09/831,507

(22) PCT Filed: Nov. 11, 1999

(86) PCT No.: PCT/BR99/00093

§ 371 (c)(1),
(2), (4) Date: Aug. 13, 2001

(87) PCT Pub. No.: WO00/30243

PCT Pub. Date: May 25, 2000

(30) Foreign Application Priority Data

Nov. 12, 1998 (BR) .............................................. 9804608

(51) Int. Cl.[7] .................................................. H02H 5/04
(52) U.S. Cl. .......................................... 361/23; 361/24
(58) Field of Search .............................. 361/18, 20, 21, 361/22, 23, 24, 25, 93.8, 93.9, 94, 96, 97, 29, 47, 38, 30

(56) References Cited

U.S. PATENT DOCUMENTS

| 4,494,163 | A |   | 1/1985  | Yelland et al. |        |
|-----------|---|---|---------|----------------|--------|
| 4,558,264 | A |   | 12/1985 | Weischedel     |        |
| 4,772,996 | A | * | 9/1988  | Hanei et al.   | 363/41 |

(List continued on next page.)

FOREIGN PATENT DOCUMENTS

| CN | 629628 | 4/1982 |
| DE | 3338764 | 5/1985 |
| GB | 2267190 | 11/1993 |
| WO | WO 01/22566 | 3/2001 |

*Primary Examiner*—Brian Sircus
*Assistant Examiner*—Danny Nguyen
(74) *Attorney, Agent, or Firm*—Smith, Gambrell & Russell, LLP

(57) ABSTRACT

A system and a method for protecting electric motors and their respective control circuits are described, wherein it is possible to distinguish whether a situation of surge current results from a overload or from a short-circuit on the motor (1). This is achieved by means of a system for protecting an electric motor (1) and its control circuit (2), the motor speed control being carried out by means of a set of switches (Ch), the system comprising a control central (7) capable of measuring the electricity conduction time ($T_c$) of each of the switches (Ch) and to measure the time ($T_d$) passed between the beginning of conduction of one of the switches (Ch) and the occurrence of a surge current, the central (7) making a comparison of said times ($T_d$, $T_c$) and being capable of determining whether said surge current results from an overload or a short-circuit of the electric motor (1) or on one of the switches (Ch). The invention also refers to a method for protecting an electric motor (1) and its control circuit (2), the speed control of which is carried out by means of a set of switches (Ch), wherein the method comprises a step of measuring the electricity conduction time ($T_c$) of each of the switches (Ch), a step of measuring the time ($T_d$) passed between the beginning of conduction of one of the switches (Ch) and the occurrence of a surge current, and a step of comprising said times ($T_d$, $T_c$) and consequently determining whether said surge current results from an overload or from a short-circuit of the motor (1). In addition, the present invention refers to an electric motor (1) that is controlled by a set of switches (Ch), the control of the switches (Ch) being carried out by a control central (7) capable of measuring and comparing said times ($T_d$, $T_c$).

18 Claims, 3 Drawing Sheets

U.S. PATENT DOCUMENTS

| | | | | |
|---|---|---|---|---|
| 4,984,647 A | * | 1/1991 | Morishita et al. | 180/446 |
| 5,008,608 A | | 4/1991 | Unsworth et al. | |
| 5,245,496 A | * | 9/1993 | Kim et al. | 361/30 |
| 5,367,424 A | * | 11/1994 | Even | 361/18 |
| 5,414,627 A | * | 5/1995 | Wada et al. | 701/41 |
| 5,467,242 A | * | 11/1995 | Kiraly | 361/94 |
| 5,530,788 A | * | 6/1996 | Saijima | 388/811 |
| 5,592,355 A | * | 1/1997 | Ikkai et al. | 361/94 |
| 5,703,768 A | | 12/1997 | Kanna et al. | |
| 5,793,596 A | * | 8/1998 | Jordan et al. | 361/98 |
| 5,894,394 A | * | 4/1999 | Baba et al. | 361/87 |
| 5,926,010 A | * | 7/1999 | Hosokawa et al. | 323/222 |
| 6,060,859 A | * | 5/2000 | Jonokuchi | 318/801 |
| 6,131,692 A | * | 10/2000 | Kawasuji | 180/446 |
| 6,205,010 B1 | * | 3/2001 | Ohsaka et al. | 361/103 |

* cited by examiner

SYSTEM AND A METHOD FOR PROTECTING AN ELECTRIC MOTOR AND ITS CONTROL CIRCUIT, AND AN ELECTRIC MOTOR

The present invention refers to a system and method for protecting a combination of an electric motor and its control circuit, which aims at detecting possible technical failures that cause the current to rise.

An electric motor basically comprises a rotor and a stator. In order for this motor to function, that is so say, for the rotor to start moving, voltage is applied to the stator, inducing the movement of the rotor.

Usually, the control of rotation speed of the motor is carried out by means of inverters, which in turn are formed from switches, as for instance a MOSFET (transistor).

The application of electric motors having controlled speed is widespread, being used, for instance, for driving compressors, household appliances, traction, etc.

Basically, when used in permanent-magnet motors without position sensors, the inverters are constituted by a set of diodes for branching the alternate voltage, from a control central that actuates the switches and a block responsible for detecting the position of the rotor by monitoring the voltages in the phases of motor, making a comparison between the monitored values. The control of the motor is carried out by modulating the voltage on the phase of the motor, which consists in applying and interrupting the voltage on the phases at a high frequency. By means of this modulation, it is possible to control the current supplied to said phases of the motor, and one can adjust it at the desired torque and speed for its operation.

In the case of induction motors, the position detector of the rotor is not used, the control of speed and torque being effected by modulating the voltage on the phases of the motor.

In both cases, a control central is employed, which is usually constituted by a microcontroller or a signal processor, which receives the external command for operation of the motor and starting from the monitoring of internal variables of the motor/inverter (current on the motor, position of the rotor, etc.), generating commands that supply voltage and current to the motor.

During the actuation and functioning of the motor, the current may undergo rises (or surge current) as a result of a overload or else as a result of a short-circuit.

The rise of the current resulting from a overload does not immediately endanger the integrity of the motor and can be controlled. However, the current rise resulting from a short-circuit has a very rapid action, and so a protection mechanism should be actuated in order to prevent damage to the motor or the respective control circuit.

DESCRIPTION OF THE PRIOR ART

The systems and methods for detecting surge current in electric motors known from the prior art usually actuate by using a predetermined current value, that is to say, a maximum current vague is predetermined, so that the motor will not be damaged and, once this value is exceeded, a protection mechanism is actuated, protecting the motor or the respective control circuit. However, this protection method does not enable one to differentiate whether the current rise results from a overload or from a short-circuit, causing the protection mechanism to be actuated in either situations.

One prior art approach is disclosed in GB 2 267 190 and is related to a circuit breaker to shut down the power of an electric motor in the event of a failure. According to this solution, three separate circuits detect a slight-overload, a severe-overload or a short-circuit are connected to a led panel to indicate the type of problem that accrued.

Another related prior art is disclosed in U.S. Pat. No. 4,558,264. According this document, an electric motor is controlled by measuring the electric current being applied. It is not foreseen a solution to protect the motor in case of an overload or a short-circuit.

Short Description of the Invention

The objective of the present invention is to provide a system and a method for detecting the occurrence of surge on electric motors and its control circuit, which will enable one to distinguish the occurrence of overload on the motor from a short-circuit, by using only a current detector adjusted to a preferred limit.

This objective is achieved by means of a system for protecting an electric motor and its control circuit, the control of motor speed being carried out by means of a set of switches, the system comprising a control central capable of measuring the electricity conduction time of each of the switches and to measure the time passed between the beginning of conduction of one of the switches and the occurrence of a surge, the central making a comparison of said times and being capable of determining whether said surge current results from a overload or from a short-circuit of the electric motor.

The present invention also refers to a method for protecting an electric motor and its control circuit, the speed control of which is effected by means of a set of switches, comprising a step of measuring the electricity conduction time of each of the switches, a step of measuring the time passed between the beginning of conduction of one of the switches and the occurrence of a surge current, and a step of comparing said times and consequently determining whether said surge current results from a overload or from a short-circuit on the electric motor.

In addition, the present invention refers to an electric motor, the speed control of which is carried out by means of a set of switches, the control of said switches being effected by a control central that is capable of measuring the electricity conduction time of each of the switches and to measure the time passed between the beginning of conduction of one of the switches and the occurrence of a surge current, the central making a comparison of the said times and being capable of determining whether said surge current results from a overload or from a short-circuit on the electric motor.

BRIEF DESCRIPTION OF THE DRAWINGS

The present invention will now be described in greater detail with reference to an embodiment represented in the drawings, in which.

DETAILED DESCRIPTION OF THE FIGURES

The system for protecting an electric motor and its control circuit according to the present invention basically comprises a surge current detector 3, adjusted to a determined current limit.

Figure 1:
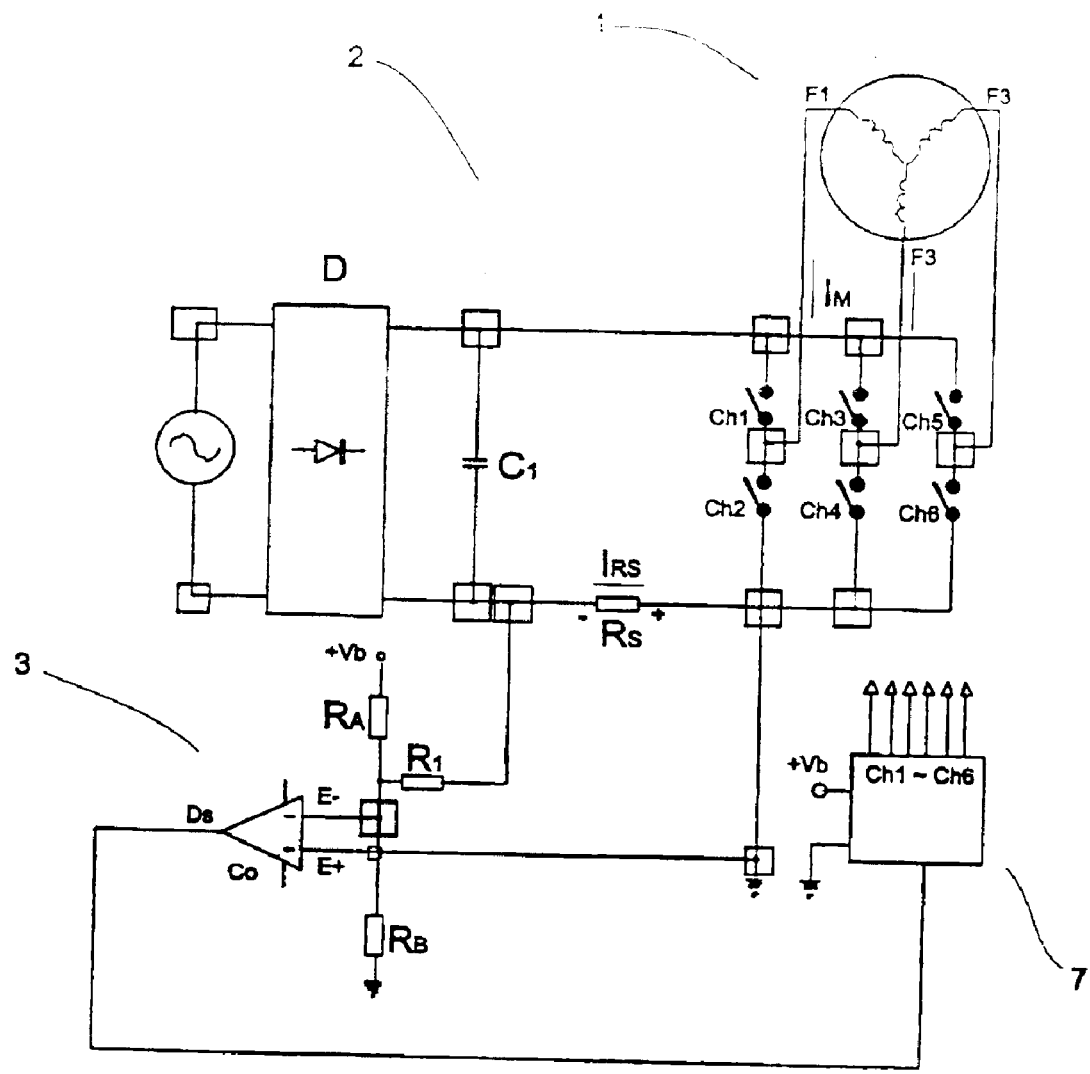
FIG. 1 represents a schematic diagram of the speed control circuit of the motor and of the surge current detector according to the present invention.

FIG. 1 schematically illustrates the motor 1 and the respective circuits for its control 2 and feeding. According to a preferred embodiment of the present invention, the motor 1 described will be of the three-phase type, which does not prevent the invention from being applied to another type of electric motor.

As can be seen from FIG. 1, the motor 1 and its control circuit 2 are fed by a source supplying alternate voltage that will be rectified by a set of diodes D and filtered by a capacitor $C_1$. A set of switches Ch1–Ch6 is responsible for the modulation of the voltage on the phases $F_1$, $F_2$, and $F_3$ of the motor 1. The control of the set of switches Ch1–Ch6 is carried out by a control central 7.

The detection of surge current is carried out by means of a surge-current detecting circuit 3 that is connected to the control central 7, which measures the current $I_{RS}$ that flows along the circuit through the resistor $R_S$, that is to say, the current that flows trough the switches Ch1–Ch6.

As illustrated in FIG. 1, the resistor $R_S$ is installed in a position of the circuit that allows one to read the current $I_M$ flowing through phases $F_1$, $F_2$, and $F_3$ of the motor, the current $I_{RS}$ basically representing the current $I_M$.

The control central 7 emits commands for closing and opening the switches Ch1–Ch6, besides receiving external information, such as the signal $D_S$, for instance. The signal $D_S$ is generated by the surge current detector 3, when a predetermined $I_{LIMIT}$ value (current limit) is exceeded.

The surge current detector 3 comprises an operational amplifier mounted as a voltage comparator $C_o$, the inlets of which are fed with voltages "E−" and "E+", wherein "E+" is the voltage of the first terminal of the resistor $R_S$, and "E−" is the voltage of the other terminal of this resistor $R_S$, plus an essentially constant voltage, defined by the voltage divider $R_A$ and $R_B$. The $+V_B$ voltage is a constant.

The resistor $R_1$ causes the voltage variations on the resistor $R_2$ (represented by the current $I_M$ of the motor) to be added to the constant voltage defined by the resistors $R_A$ and $R_B$.

For a situation in which the current $I_M$ flowing through the motor 1 is close to zero, the voltage "E−" is higher than the voltage "E+", thus causing the outlet $D_S$ of the voltage comparator $C_o$ to be at "low" level.

When the current though the motor 1 rises above a $I_{LIMIT}$ limit defined by the resistors $R_A$, $R_B$ and $R_1$, the voltage in the inlet "E−" becomes lower than the voltage in the inlet corresponding to a current value beyond the admissible limit, that is to say, above the $I_{LIMIT}$ limit, thus characterizing the detection of surge current. In this situation, the outlet of the comparator $C_o$ passes from "low" level to "high" level, signaling the occurrence of surge current to the control central 7 by means of $D_S$.

The differentiation between a overload and a short-circuit is made by measuring the rise variation time of the current $I_{RS}$, i.e., in the event of overload, the current rise occurs gradually, taking a relatively long period of time, until the $I_{LIMIT}$ value is reached, whereas in the cases when the motor 1 enters into short-circuit, the $I_{LIMIT}$ value is reached much more rapidly, thus enabling one to detect this kind of failure by measuring the time.

Figure 2:
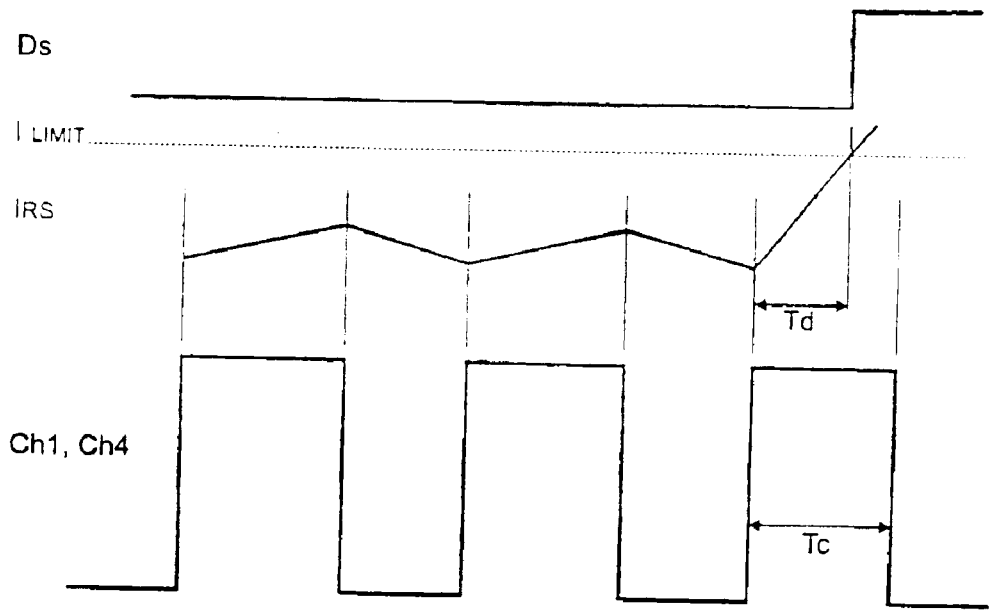
FIG. 2 shows a temporal diagram representing the behavior of the current in a overload current situation.
Figure 3:
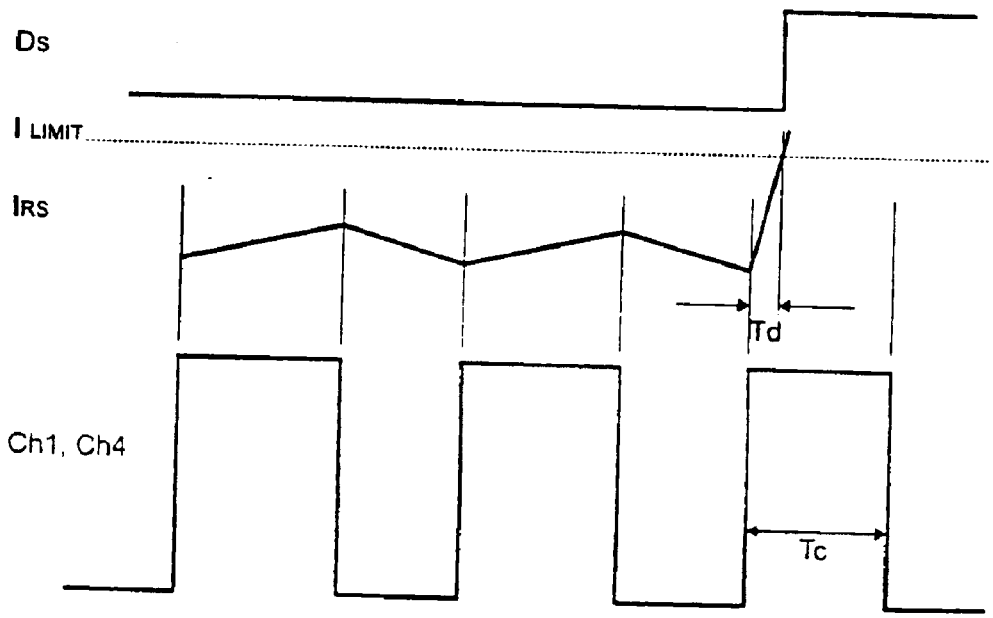
FIG. 3 shows a temporal diagram representing the behavior of the current in a short-circuit situation.

As already known from the prior art, the speed control is carried out by means of switches Ch1–Ch6 and, as illustrated in FIGS. 2 and 3, the switches Ch1,Ch4 conduct electricity for a determined period of time $T_c$ that varies depending upon the rotation speed to be imposed to the motor 1.

In order to determine by means of the control central 7 whether the kind of failure on the motor 1 results from a overload or from a short-circuit, the present invention foresees the $T_c$-time and $T_d$-time measurement. The $T_d$-time is counted from the beginning of the conduction of the switches Ch until the moment when the current has reached the $I_{LIMIT}$ value, that is to say, when the surge current occurred (see FIGS. 2 and 3). The $T_c$-time is the time of conduction of the switches Ch and depends upon the situation of motor operation (basically speed and load).

FIGS. 2 and 3 represent the temporal diagrams of the situations of overload and short-circuit, respectively. By comparing the two diagrams, one can see in detail that, in the short-circuit situation, the current $I_{RS}$ reaches the $I_{LIMIT}$ value in much shorter $T_d$ time when compared with the $T_d$ time in the overload situation.

Figure 4:
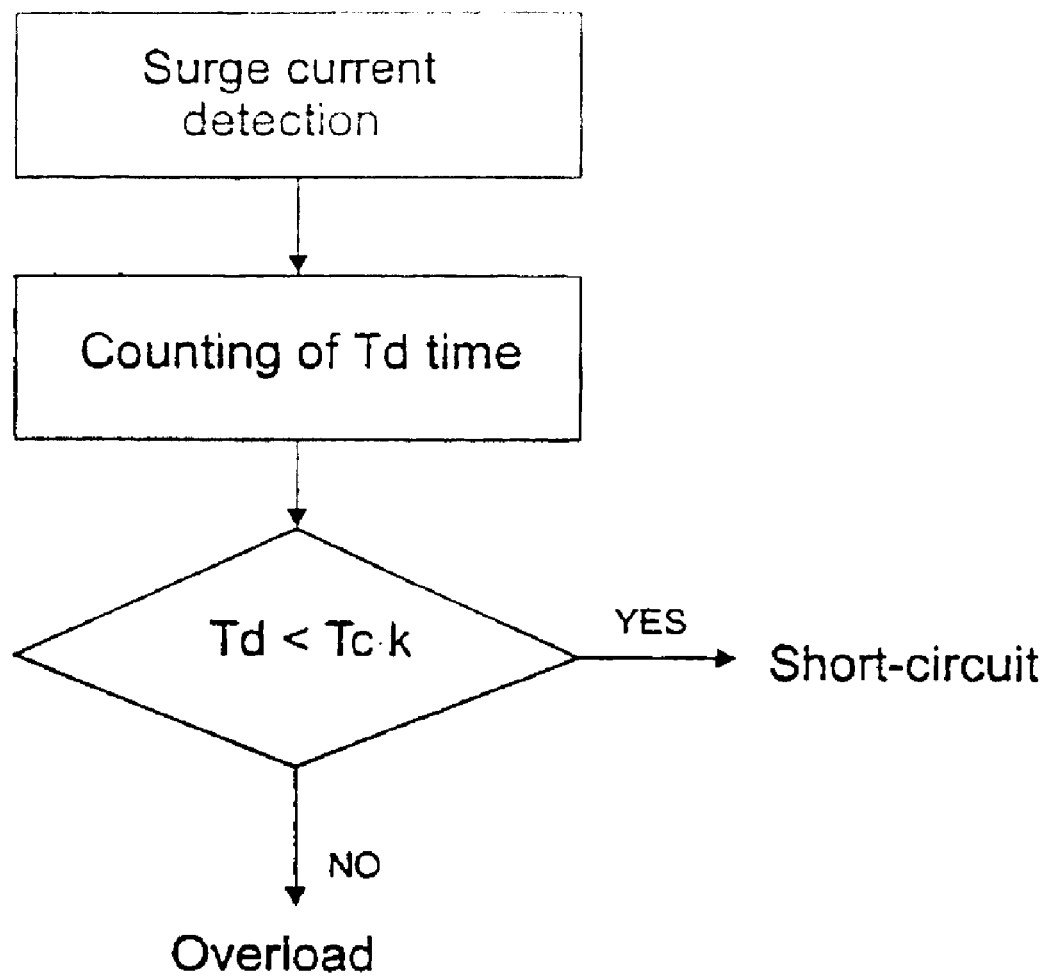
FIG. 4 represents a flow-diagram of the method according to the present invention.

As can be seen from FIG. 4 schematically, the criterion used for determining whether the surge current results from a overload or from a short-circuit depends upon a relation between the $T_d$ and $T_c$ times. Thus, when the relation $T_d<T_c$ k is true, this means that the motor 1 is in short-circuit, and when the relation is false, this means that the motor 1 has undergone a overload. The measurement of the $T_d$ and $T_c$ times, as well as the comparison between the respective values is carried out by means of the control central 7.

The value of the constant k is a fraction or portion of the $T_c$ value (being a number between 0 and 1), and defines the limit for the distinction of the kind of failure that occurred on the motor 1, and may vary depending upon the type of motor 1 in use, in addition to the protection level to be given to the latter.

For instance, if the value of k is 50% (or 0.5) and if the $T_d$ time is short (shorter than 50% of $T_c$), this means that the motor 1 is in short-circuit, and it is necessary to add some protection mechanism in order to avoid damage to said motor 1. In the cases when $T_d$ is longer (longer than or equal to 50% of $T_c$), this means that the motor 1 has undergone a overload.

Besides enabling one to differentiate the kind of failure occurred on the motor 1 or on one of the switches Ch1–Ch6, the present invention further enables one to estimate the value of the surge that occurred on the motor 1 by evaluating the proportion $T_d/T_c$.

A preferred embodiment of the invention having been described, it should be understood that the scope of the present invention embraces other possible variations, being limited only by the contents of the accompanying claims, the possible equivalents being included therein.

What is claimed is:

1. A system for protecting an electric motor and its control circuit, the control circuit comprising a set of switches to control the speed of the motor, the system being characterized by:

comprising a control central connected to the control circuit, the control central being capable of measuring an electricity conduction time ($T_c$) of each of the switches and to measure a time ($T_d$) passed between the beginning of the conduction of one of the switches and the occurrence of a surge current, the surge being measured by means of a surge detector which compares the value of a current ($I_{RS}$) that flows through the control circuit to a predetermined current ($I_{LIMIT}$) value, the control central making a comparison between the times ($T_d$, $T_c$) and being capable of determining whether the surge current results from an overload or from a short-circuit on the electric motor or any of the switches.

2. A system according to claim 1, characterized in that the control central indicates a condition of short-circuit of the motor or on one of the switches when the time ($T_d$) is shorter than the time ($T_c$) multiplied by a factor (k) that ranges from 0 to 1, and the control central indicates a condition of overload of the motor when the time ($T_d$) is longer than the time ($T_c$) multiplied by the factor (k).

3. A system according to claim 2, characterized in that the factor (k) is equal to 0.5.

4. A method for protecting an electric motor and its circuit, the speed control of the motor being carried out by means of a set of switches, the method being characterized by comprising the steps of:
measuring an electricity conduction time ($T_c$) of each of the switches,
measuring a lime ($T_d$) passed between the beginning of conduction of one of the switches and the occurrence of a surge, and
comparing the times ($T_d$, $T_c$) and consequently determining whether the surge current results from an overload or from a short-circuit of the electric motor or on any of the switches.

5. A method according to claim 4, characterized in that, in the comparison step, a condition of short-circuit of the motor or on one of the switches (Ch) is indicated when the time ($T_d$) is shorter than the time ($T_c$) multiplied by a factor (k) that ranges from 0 to 1, and an overload condition of the motor is indicated when the time ($T_d$) is longer than the lime ($T_c$) multiplied by the factor (k).

6. A method according to claim 3, characterized in that, in the comparison step the factor (k) is equal to 0.5.

7. An electric motor having phases,
the phases being fed by a set of switches, and
the switches being controlled by a control circuit to modulate a voltage that is applied to the phases to control the speed of the motor, the motor being characterized in that the control of the switches is carried out by a control central connected to the control circuit,
the control central being capable of measuring the electricity conduction time ($T_c$) of each of the switches and to measure the time ($T_d$) passed between the beginning of conduction of one of the switches and the occurrence of a surge current,
the surge being a value of a current ($I_{RS}$) that flows trough the phases higher than a predetermined current ($I_{LIMIT}$) value,
the control central making a comparison between the times ($T_d$, $T_c$) and being capable of determining whether the surge current results from an overload or from a short-circuit of the phases of the electric motor or any of the switches.

8. A motor according to claim 7, characterized in that the control central indicates a condition of short-circuit of the motor when the time ($T_d$) is shorter than the time ($T_c$) multiplied by a factor (k) that varies between 0 and 1, and the control central indicates a condition of overload of the motor (1) when the time ($T_d$) is longer than the time ($T_c$) multiplied by the factor (k).

9. A motor according to claim 8, characterized in that the factor (k) is equal to 0.5.

10. A protection system for protecting a control circuit of an electric motor and protecting the electric motor,
the control circuit comprising a set of switches to control the speed of the motor,
the system comprising a control central connected to the control circuit, the control central selectively commanding the switches,
the control central measuring an electricity conduction time ($T_c$) of each of the switches and measuring a disturbance time ($T_d$) passed between the beginning of the conduction of one of the switches and the occurrence of a surge current, the surge being measured by means of a surge detector which compares the value of a current ($I_{RS}$) that flows through the control circuit to a predetermined current ($I_{LIMIT}$) value,
the control central making a comparison between said the disturbance time ($T_d$) and the conduction time ($T_c$) to determine whether the surge current results from an overload or from a short-circuit on the electric motor or any of the switches.

11. A system according to claim 10, wherein the control central indicates a condition of short-circuit of the motor or on one of the switches when the disturbance time ($T_d$) is shorter than the conduction time ($T_c$) multiplied by a factor (k) that ranges from 0 to 1, the control central indicating a condition of overload of the motor when the disturbance time ($T_d$) is longer than the conduction time ($T_c$) multiplied by said factor (k).

12. A system according to claim 2, wherein said factor (k) is equal to 0.5.

13. A method for protecting a control circuit of an electric motor and protecting the electric motor,
the speed control of the motor being carried out by selectively commanding a set of switches,
the method comprising the steps of:
measuring an electricity conduction time ($T_c$) of each of the switches,
measuring the disturbance time ($T_d$) passed between the beginning of conduction of one of the switches and the occurrence of a surge,
comparing the disturbance time ($T_d$) with the conduction time ($T_c$).

14. A method according to claim 13, wherein, in said comparison step, a condition of short-circuit of the motor or on one of the switches is indicated when the disturbance time ($T_d$) is shorter than the conduction time ($T_c$) multiplied by a factor (k) that ranges from 0 to 1, and an overload condition of the motor (I) is indicated when the disturbance time ($T_d$) is longer than the conduction time ($T_c$) multiplied by said factor (k).

15. A method according to claim 14, wherein, in said comparison step said factor (k) is equal to 0.5.

16. An electric motor having phases,
said phases being fed by a set of switches,
said switches being controlled by a control circuit to modulate a voltage that is applied to said phasesto control the speed of the motor,
wherein the control of the switches is carried out by a control central connected to the control circuit,
the control central measures the electricity conduction time ($T_c$) of each of the switches and measures the disturbance time ($T_d$) passed between the beginning of conduction of one of the switches and the occurrence of a surge current,
the surge being a value of a current ($I_{RS}$) that flows through the phases higher than a predetermined current ($I_{LIMIT}$) value,
the control central making a comparison between the disturbance time ($T_d$) and the conduction time ($T_c$) to determine whether the surge current results from an overload or from a short-circuit of the phases of the electric motor or any of the switches.

17. A motor according to claim 16, wherein the control central (7) indicates a condition of short-circuit of the motor when the disturbance time ($T_d$) is shorter than the conduction time ($T_c$) multiplied by a factor (k) that varies between 0 and 1, the central indicating a condition of overload of the motor when the disturbance time ($T_d$) is longer than the conduction time ($T_c$) multiplied by said factor (k).

18. A motor according to claim 9, wherein said factor (1) is equal to 0.5.

* * * * *